(12) United States Patent
Li

(10) Patent No.: US 10,488,925 B2
(45) Date of Patent: Nov. 26, 2019

(54) DISPLAY CONTROL DEVICE, CONTROL METHOD THEREOF, AND DISPLAY CONTROL SYSTEM

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/540,371

(22) PCT Filed: Oct. 25, 2016

(86) PCT No.: PCT/CN2016/103244
§ 371 (c)(1),
(2) Date: Jun. 28, 2017

(87) PCT Pub. No.: WO2017/124794
PCT Pub. Date: Jul. 27, 2017

(65) Prior Publication Data
US 2018/0107274 A1    Apr. 19, 2018

(30) Foreign Application Priority Data
Jan. 21, 2016  (CN) .......................... 2016 1 0041709

(51) Int. Cl.
*G06F 3/01* (2006.01)
*G02B 27/01* (2006.01)
(Continued)

(52) U.S. Cl.
CPC .......... *G06F 3/015* (2013.01); *G02B 27/0093* (2013.01); *G02B 27/0172* (2013.01);
(Continued)

(58) Field of Classification Search
CPC .......... G06F 3/013; G06F 3/015; G06F 3/017; G02B 27/0172; G02B 2027/014
See application file for complete search history.

(56) References Cited

U.S. PATENT DOCUMENTS

2008/0154148 A1* 6/2008 Chung .................... G06F 3/015
                                                        600/544
2012/0257035 A1   10/2012 Larsen
(Continued)

FOREIGN PATENT DOCUMENTS

CN    102749990 A    10/2012
CN    203012636 U    6/2013
(Continued)

OTHER PUBLICATIONS

Chinese Office Action dated Dec. 19, 2017.
Search Report and Written Opinion dated Feb. 7, 2017 from State Intellectual Property Office of the P.R. China.

*Primary Examiner* — Sanjiv D. Patel
(74) *Attorney, Agent, or Firm* — Dilworth & Barrese, LLP; Michael J. Musella, Esq.

(57) ABSTRACT

A display control device, a control method thereof, and a display control system are provided. The display control method includes: acquiring a gaze position on a display image while eyes are gazing at a current display image, and acquiring a current brain wave while the eyes are gazing at the current display image; determining a control instruction corresponding to the current brain wave according to the current brain wave, in condition that a characterized parameter of the current brain wave meets a preset condition; executing an operation corresponding to the control instruction on the display image being gazed. The operation convenience when the user is using the wearable device can be increased.

19 Claims, 9 Drawing Sheets

(51) Int. Cl.
*G06F 3/0482* (2013.01)
*G06F 3/0484* (2013.01)
*G02B 27/00* (2006.01)

(52) U.S. Cl.
CPC ............ *G06F 3/013* (2013.01); *G06F 3/0482* (2013.01); *G06F 3/04842* (2013.01); *G02B 2027/014* (2013.01); *G02B 2027/0138* (2013.01); *G02B 2027/0178* (2013.01)

(56) References Cited

U.S. PATENT DOCUMENTS

| | | | | |
|---|---|---|---|---|
| 2014/0354534 | A1* | 12/2014 | Mullins | G06F 3/015 345/156 |
| 2015/0091791 | A1* | 4/2015 | Segal | G06F 16/436 345/156 |
| 2015/0199003 | A1* | 7/2015 | Zhang | G06F 3/013 345/156 |
| 2015/0277560 | A1* | 10/2015 | Beaty | G06F 3/015 345/156 |
| 2015/0283904 | A1* | 10/2015 | Schlittenbauer | B60K 37/06 345/173 |
| 2016/0139665 | A1* | 5/2016 | Lopez | G06F 3/013 345/156 |
| 2017/0293794 | A1* | 10/2017 | Tsurumi | A61B 3/113 |
| 2018/0196511 | A1* | 7/2018 | Chae | G06F 3/013 |

FOREIGN PATENT DOCUMENTS

| | | | |
|---|---|---|---|
| CN | 105138119 | A | 12/2015 |
| CN | 105528084 | A | 4/2016 |

\* cited by examiner

DISPLAY CONTROL DEVICE, CONTROL METHOD THEREOF, AND DISPLAY CONTROL SYSTEM

TECHNICAL FIELD

Embodiments of the present disclosure relate to a display control device, a control method thereof, and a display control system.

BACKGROUND

With continuous development of a display technology, a display device such as a television, a computer and a mobile phone and other electronic products has gradually become a necessity in people's daily lives. However, when a user uses the above-described display device, he/she usually needs to use a number of auxiliary devices to manipulate the display device. For example, when the user is playing a game, he/she needs to use a game handle, to implement display screen positioning or equipment switching and other operations. For example, in a procedure when the user is viewing a picture or a movie, he/she needs to control the picture displayed on the display device with a remote controller. In this way, convenience of using the display device is reduced.

SUMMARY

According to an embodiment of the present disclosure, it is provided a display control method, comprising: acquiring a gaze position on a display image while eyes are gazing at a current display image, and acquiring a current brain wave while the eyes are gazing at the current display image; determining a control instruction corresponding to the current brain wave according to the current brain wave, in condition that a characterized parameter of the current brain wave meets a preset condition; and executing an operation corresponding to the control instruction on the display image being gazed.

As an example, the determining a control instruction corresponding to the current brain wave according to the current brain wave, comprises: determining the characterized parameter of the current brain wave; matching the characterized parameter of the current brain wave with a characterized parameter of a preset brain wave in a brain wave data set, the brain wave data set being pre-stored with corresponding relationship between the characterized parameter of the preset brain wave and the control instruction; acquiring a control instruction corresponding to the matched preset brain wave, in condition that the characterized parameter of the current brain wave matches with the characterized parameter of the preset brain wave successfully.

As an example, before the acquiring the current brain wave, the method further comprises: determining and storing the characterized parameter of the preset brain wave; and establishing the brain wave data set.

As an example, the characterized parameter is at least one of a frequency and an amplitude of a brain wave.

As an example, the display control method is a display control method executed by a wearable device, and the acquiring a gaze position on a display image while eyes are gazing at the display image, comprises: acquiring an eye image, and determining a pupil position; calculating a sight line direction according to the pupil position; deriving the gaze position of the eye on the display image, according to a mapping relationship between the sight line direction and the display image.

According to an embodiment of the present disclosure, it is provided a display control device, comprising: an acquiring module, configured for acquiring a gaze position on a display image while eyes are gazing at a current display image, and acquiring a current brain wave while the eyes are gazing at the current display image; a determining module, configured for determining a control instruction corresponding to the current brain wave according to the current brain wave, in condition that a characterized parameter of the current brain wave meets a preset condition; an executing module, configured for executing an operation corresponding to the control instruction on the display image being gazed.

As an example, the display control device further comprises a storage module, the acquiring module comprises a brain wave acquiring sub-module which is configured for acquiring the current brain wave, and the determining module comprises a characterized parameter acquiring sub-module and an instruction assembly sub-module; the characterized parameter acquiring sub-module is connected with the brain wave acquiring sub-module and is configured for determining the characterized parameters of the current brain wave and the preset brain wave; the instruction assembly sub-module is connected with the characterized parameter acquiring sub-module and is configured for establishing a brain wave data set, the brain wave data set being pre-stored with corresponding relationship between the characterized parameter of the preset brain wave and the control instruction; the storage module is connected with the characterized parameter acquiring sub-module and the instruction assembly sub-module and is configured for storing the control instruction, the characterized parameter, and the brain wave data set.

As an example, the determining module further comprises a character matching sub-module; the character matching sub-module is connected with the characterized parameter acquiring sub-module and the storage module and is configured for matching the characterized parameter of the current brain wave acquired by the characterized parameter acquiring sub-module with the characterized parameter of the preset brain wave in the brain wave data set of the storage module.

As an example, the determining module further comprises an instruction acquiring sub-module, the instruction acquiring sub-module being connected with the character matching sub-module and the storage module respectively and being configured for acquiring the control instruction corresponding to the matched preset brain wave from the storage module, in condition that the characterized parameter of the current brain wave matches with the characterized parameter of the preset brain wave successfully.

As an example, the acquiring module comprises: an eye image acquiring sub-module, a sight line determining sub-module, and a position calculating sub-module; the eye image acquiring sub-module is configured for acquiring an eye image, and determining a pupil position; the sight line determining sub-module is connected with the eye image acquiring sub-module and is configured for calculating a sight line direction; the position calculating sub-module is connected with the sight line determining sub-module and is configured for deriving a gaze position of the eyes on the display image, according a to mapping relationship between the sight line direction and the display image.

According to an embodiment of the present disclosure, display control system, comprising: a display device, a wearable device, and a controller, wherein, the display device is configured for displaying an image serving as a current display image; the wearable device is configured for acquiring a gaze position on a display image while eyes are gazing at a current display image, and acquiring a current brain wave while the eyes are gazing at the current display image; the controller is configured for determining a control instruction corresponding to the current brain wave according to the current brain wave, in condition that a characterized parameter of the current brain wave meets a preset condition; and executing an operation corresponding to the control instruction on the display image being gazed.

As an example, the display device and the wearable device are separately provided and connected with each other in a wired or wireless manner for information exchange, and the controller is provided in the display device.

As an example, the wearable device comprises a head-mounted support, an image acquisition device, and a processor, the head-mounted support being provided with a brain wave acquisition circuit for acquiring the current brain wave, the image acquisition device being configured for acquiring human eye imaging, and the processor being configured for determining the gaze position of the eyes on the display image according to the image acquired by the image acquisition device; and the processor is further configured for transmitting the current brain wave and the gaze position to the display device.

As an example, the wearable device comprises a head-mounted support, and the head-mounted support is integrated with the display device and the controller.

As an example, the head-mounted support is provided with a brain wave acquisition circuit for acquiring the current brain wave, an image acquisition device for acquiring human eye imaging, and a processor for determining the gaze position of the eyes on the display image according to the image acquired by the image acquisition device; and the processor is further configured for transmitting the current brain wave and the gaze position to the display device.

As an example, the brain wave acquisition circuit comprises a forehead sensor and at least one earlobe sensor.

As an example, the image acquisition device is a CCD image sensor or a CMOS image sensor.

As an example, both the image acquisition device and the display device are provided with an infrared light source.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
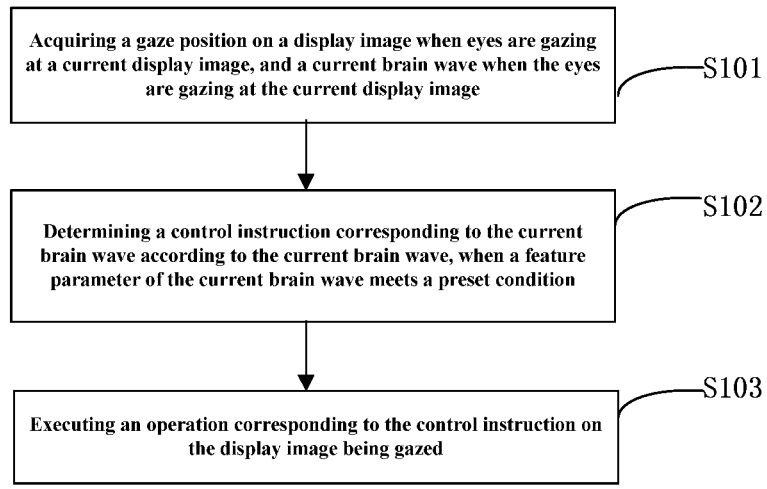
FIG. 1*a* is a flow chart of a display control method provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

At present, both normal display and virtual reality display are involved in interaction between a user and a display device, to implement operation or control of the display image. At present, the user interacts with the display device through an external device or a touch screen, so that convenience of user's operation is unsatisfactory. Therefore, there is proposed a display control device, a control method thereof, and a display control system, which can implement interaction with the display device without manual operation, but only with eyes and a brain wave of the user.

The brain wave is a potential difference generated among cerebral cortex cell populations when a human brain is in a thinking activity, so as to generate a cerebral cortex extracellular current. When the human brain is transmitting different information, brain wave parameters (e.g., a frequency or an amplitude of the brain wave, etc.) are different. A display device having an information processing function can detect the brain wave when the user interacts with the display device, and acquire a gaze position at which the user gazes on the display image, so that the user's interaction instruction can be determined.

The interaction between the user and the display device provided by the embodiment of the present disclosure is applicable to a variety of application scenarios. For example, one of application scenarios is that, the user wears a wearable device, and transmits interaction information (including the brain wave of the user and the gaze position at which the user gazes on the display image acquired) to the display device (e.g., a mobile phone, a computer, a television, etc.) through the wearable device, and the display device recognizes the above-described interaction information and executes a corresponding control instruction.

For example, another application scenario is that, the user wears a wearable device on which a display device is integrated, so as to perform interaction between the wearable device and the display device integrated on the wearable device by transmitting interaction information such as the brain wave and the gaze position at which the user gazes on the display image acquired as described above.

The display devices of the above-described two application scenarios both have a data processing capability, for example, a display device having a controller. It can be contemplated that the controller may be separated from the display device. For example, for the second application scenario, the controller may be integrated on the wearable device, and the display device has only a display function.

Hereinafter, the technical solutions of the embodiments of the present disclosure will be described in a clearly and fully understandable way in conjunction with the drawings related to the embodiments of the present disclosure.

An embodiment of the present disclosure provides a display control method, as illustrated in FIG. 1a, comprising steps of:

S101: acquiring a gaze position on a display image when eyes are gazing at a current display image, and a current brain wave when the eyes are gazing at the current display image.

For example, illustration is provided with the above-described first application scenario as an example.

For example, the display device is a computer having a controller (e.g., the controller being a CPU) and the wearable device is a head-mounted wearable device. Then, the user wears the head-mounted wearable device when he/she intends to interact with the display device and gazes at the current display image displayed on the computer.

In this case, when the user wears the head-mounted wearable device and gazes at the current display image displayed on the computer, the head-mounted wearable device acquires the gaze position and the current brain wave of the user, and provides the gaze position and the current brain wave as described above to the computer, so that the computer acquires the gaze position and the current brain wave as described above.

How the head-mounted wearable device acquires the gaze position and the current brain wave will be described in detail later, which is not introduced here.

Figure 1B:
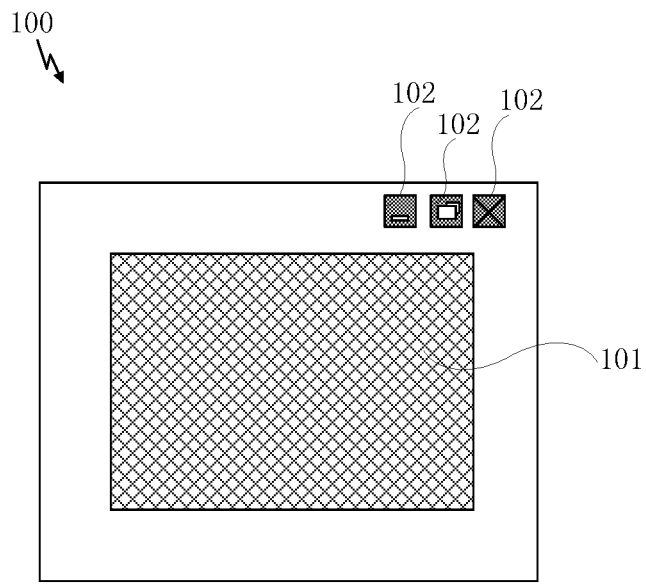
FIG. 1*b* is a schematic diagram of a display image of a display control device provided by an embodiment of the present disclosure.

Further, for example, the computer display image is a display image 100 as illustrated in FIG. 1b, the display image comprises an image main content 101 and operation icons 102; for example, three operation icons 102 in FIG. 1b are sequentially a minimize icon, a restore icon, or a close icon, etc. from left to right. If the user intends to close the image main content 101 in the display image 100, he/she gazes at the close icon, the wearable device detects the gaze position of the user's eyes and the brain wave when the user is gazing, and transmits the gaze position and the brain wave to the display device by wired or wireless means.

S102: determining a control instruction corresponding to the current brain wave according to the current brain wave, when a characterized parameter of the current brain wave meets a preset condition.

For example, the characterized parameter of the brain wave may be at least one of the frequency and the amplitude of the brain wave. The control instruction may be an instruction corresponding to the operation icon 102, for example, control instructions corresponding to icons of close, save, minimize, maximize, confirm, select, and so on. For example, the instruction corresponding to the close icon may be a close instruction.

For example, illustration is provided with a case where the characterized parameter of the brain wave is the frequency as an example.

When the gaze position and the brain wave during gazing are acquired by the step S101, it is judged whether the frequency of the current brain wave meets the preset condition or not; if so, the control instruction corresponding to the current brain wave is determined according to the current brain wave, otherwise, do nothing, or report errors.

For example, the step of determining a control instruction corresponding to the current brain wave according to the current brain wave, when a characterized parameter of the current brain wave meets a preset condition, comprises: determining the characterized parameter of the current brain wave; matching the characterized parameter of the current brain wave with a characterized parameter of a preset brain wave in a brain wave data set, the brain wave data set being pre-stored with corresponding relationship between the characterized parameter of the preset brain wave and the control instruction; acquiring a control instruction corresponding to the matched preset brain wave, when the characterized parameter of the current brain wave matches with the characterized parameter of the preset brain wave successfully.

For example, if the frequency of the current brain wave is a frequency of the brain wave of the user who is in a focused state, it is believed that the user are gazing at a position that intends to execute a certain operation, and when the gaze position is the close icon as illustrated in FIG. 1b, it is determined that the control instruction corresponding to the current brain wave is the close instruction.

S103: executing an operation corresponding to the control instruction at the gaze position of the display image 100.

For example, when it is determined that the control instruction is the close instruction, an operation of closing the display image 100 is executed.

The embodiment of the present disclosure provides a display control method, comprising: acquiring the gaze position on the display image when eyes are gazing at the current display image and the current brain wave when the eyes are gazing at the current display image; next, determining the control instruction corresponding to the current brain wave according to the current brain wave, when the characterized parameter of the current brain wave meets the preset condition; and finally, executing the corresponding operation at the gaze position of the display image according to the control instruction. In this way, the user can select or control an operation position on the display image by the eyes, and the user can send out different brain waves in different thinking states, and therefore, it is possible to judge whether the user intends to execute the corresponding operation at the above-described gaze position through the brain wave or not. Therefore, in the above-described control procedure, it is possible to implement the corresponding operation without manual operation, so that operation convenience when the user is using the wearable device can be increased.

It should be noted that, the display image gazed by the user may be a real image displayed on the display device, or may be a virtual image displayed by the wearable device through a projection device. For example, the projection device projects the real display image of the display device onto a human retina, and a visual effect is that there is a virtual image within a field range of the human eyes.

In the above-described step S102, the preset condition is related to the brain wave characterized parameter; and for various brain wave parameters, the preset conditions are various, then the method illustrated in FIG. 1a corresponding to the preset condition is also slightly different.

For example, if the above-described characterized parameter is the frequency of the brain wave, the preset condition is a frequency threshold.

Further, a focus degree when the user is viewing the image main content 101 is generally lower than a focus degree when executing the above-described operation icon 102. Thus, the user sends out a brain wave (8 Hz to 12 Hz) when viewing the image main content 101, and sends out 13 brain wave (12 Hz to 30 Hz) when he/she intends to execute the above-described operation icon 102. For example, the above-described frequency threshold may be 12 Hz. That is, when the frequency of the current brain wave is less than 12 Hz, it indicates that the user is only viewing the image main content 101, without any intention of executing the operation icon 102; whereas when the frequency of the current brain wave is greater than or equal to 12 Hz, it indicates that the user intends to execute the operation icon 102, and in this case, the control instruction corresponding to the current brain wave executes the operation icon 102, for example, by clicking the close icon. In this way, when the frequency of the acquired current brain wave is greater than the above-described frequency threshold (12 Hz), it is determined that the user intends to click the operation icon 102. Next, the click operation may be executed for the operation icon 102 at the user's gaze position. When the frequency of the acquired current brain wave is less than the above-described frequency threshold (12 Hz), no operation is performed on the operation icon 102.

Figure 1C:
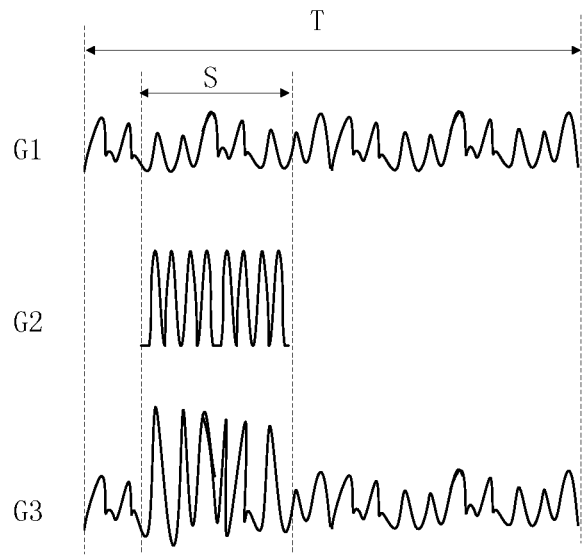
FIG. 1*c* is a schematic diagram of variation of a peak value after a brain wave is affected by an electromyogram.

For example, if the above-described characterized parameter is both the frequency and the amplitude of the brain wave, the preset condition comprises a frequency threshold and whether a waveform peak value of the current brain wave is abruptly varied in an acquisition stage T as illustrated in FIG. 1c.

Eye muscle contraction will also generate a certain wave, that is, an electromyogram G2 (illustrated in FIG. 1c). For example, the eye muscle contraction may be caused by a blink, so that a peak value of the amplitude of the brain wave G1 will be abruptly varied at a moment S in the above-described acquisition stage T. A waveform G1 in FIG. 1c is a waveform of the brain wave whose amplitude peak value is not abruptly varied. The above-described moment S is a moment when the electromyogram G2 is superimposed on the waveform of the brain wave G1 whose peak value is not abruptly varied. A waveform G3 in FIG. 1c is a waveform in which the brain wave G1 and the electromyogram G2 are superimposed.

Based on this, when the frequency of the acquired current brain wave is greater than or equal to the above-described frequency threshold (e.g., 12 Hz), that is, the user is in a clear and focused state, and intends to execute the operation icon 102. Next, it is necessary to judge whether to click or double-click the operation icon 102. At this time, when the amplitude peak value of the current brain wave at the moment S is greatly varied, it indicates that the user blinks when viewing the display image 100, and at this time, the control instruction corresponding to the current brain wave is double-clicking the operation icon 102; and when the amplitude of the current brain wave is not varied during the acquisition procedure, it indicates that the user does not blink when viewing the display image 100, and at this time, the control instruction corresponding to the current brain wave may be clicking the operation icon 102 once. In addition, when the frequency of the acquired current brain wave is less than the above-described frequency threshold (12 Hz), no operation is performed on the operation icon 102.

For example, if the above-described characterized parameter is the amplitude of the brain wave, the preset condition comprises whether the waveform peak value of the current brain wave is abruptly varied in the acquisition stage T as illustrated in FIG. 1c.

For example, when the user cannot see the image 101 clearly, the eyes are usually squinted, which may cause eye muscle contraction as well, so that the peak value of the amplitude of the brain wave G1 will be abruptly varied at the moment S in the above-described acquisition stage T.

Based on this, when the amplitude peak value of the current brain wave varies greatly at the moment S, it indicates that the user is squinting to view the display image 100, and at this time, the control instruction corresponding to the current brain wave may be zooming in the display image 100. When the amplitude of the current brain wave is not varied, no operation is performed on the display image 100.

As can be seen from the above, it is possible to pre-store some characterized parameters corresponding to the control instruction in the wearable device. For example, the brain wave β with a frequency of 12 Hz to 30 Hz corresponds to the control instruction of a single click. However, when the frequency of the above-described current brain wave is within a range of 12 Hz to 30 Hz, only the control instruction of a single-click operation can be acquired; with respect to other control instructions, such as a double-click operation or a zoon-in operation, it is necessary to implement in combination with influence of the electromyogram obtained by eye muscle contraction or expansion on the amplitude of the current brain wave. In this way, complexity of acquiring the control instructions is increased. In order to solve the above-described problem, the embodiment of the present disclosure may comprise a plurality of control instructions.

Figure 2:
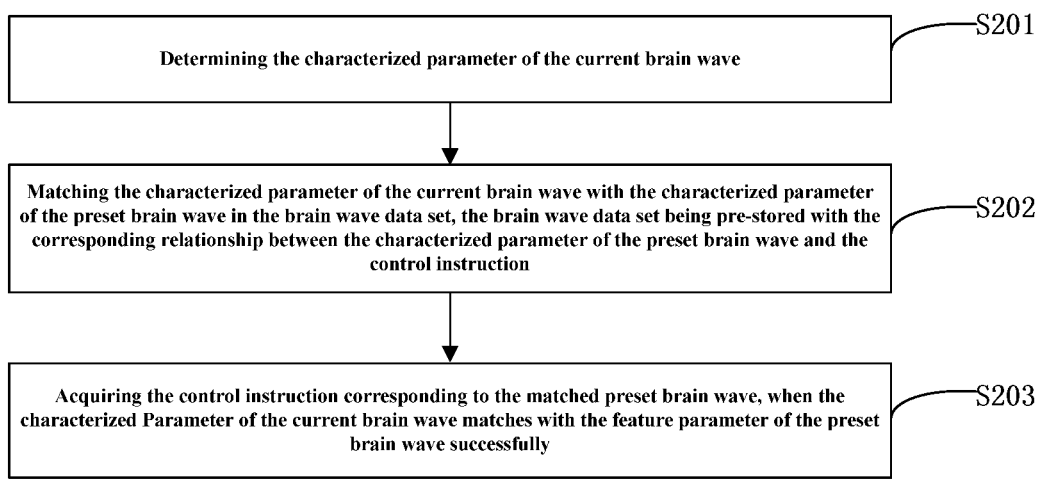
FIG. 2 is a detailed flow chart of a method in which step S102 of FIG. 1*a* is involved.

For example, as illustrated in FIG. 2, the step of determining a control instruction corresponding to the current brain wave according to the current brain wave, may comprise steps of:

S201: determining the characterized parameter of the current brain wave.

For example, the above-described characterized parameter may comprise the frequency and the amplitude of the current brain wave. Hereinafter, for convenience of explanation, it is illustrated with the frequency as the characterized parameter.

S202: matching the characterized parameter of the current brain wave with the characterized parameter of the preset brain wave in the brain wave data set. Wherein, the brain wave data set is pre-stored with the corresponding relationship between the characterized parameter of the preset brain wave and the control instruction.

It should be noted that, the matching the characterized parameter of the current brain wave with the characterized parameter of the preset brain wave refers to that, difference between the characterized parameter of the current brain wave and the characterized parameter of the preset brain wave is within a tolerance deviation range. The deviation may be determined by accuracy of the wearable device. It is not limited in the embodiment of the present disclosure.

S203: acquiring the control instruction corresponding to the matched preset brain wave, when the characterized parameter of the current brain wave matches with the characterized parameter of the preset brain wave successfully.

It should be noted that, the preset brain wave is a brain wave pre-stored in the wearable device in factory settings or initialization of the wearable device.

For example, it is possible to acquire different preset brain waves sent by the user in a clear and focused state when he/she is in different thinking activity states, in factory settings or initialization of the wearable device. For example, although the frequency of the brain wave β sent by the user in the clear and focused state will be 12 Hz to 30 Hz, yet, different thinking activities will make a slight difference between the frequencies of the brain waves within the range of 12 Hz to 30 Hz. For example, the frequency of the preset brain wave when the user intends to perform the control instruction of a single-click operation is from 12 Hz to 15 Hz, the frequency of the preset brain wave when the user intends to perform the control instruction of a double-click operation is from 18 Hz to 21 Hz, and the frequency of the preset brain wave when the user intends to perform the control instruction of a close operation is from 25 Hz to 30 Hz. In this case, the above-described current brain wave may be acquired, and then the frequency of the current brain wave is matched with the frequency of the preset brain wave in the brain wave data set. For example, when the frequency of the current brain wave is within the range of 25 Hz to 30 Hz, the frequency of the current brain wave matches with the frequency of the preset brain wave successfully, so that the control instruction of the close operation corresponding to the matched preset brain wave may be acquired. For example, when the frequency of the current brain wave is within the range of 12 Hz to 15 Hz, the frequency of the current brain wave matches with the frequency of the preset brain wave successfully, so that the control instruction of the single-click operation corresponding to the matched preset brain wave may be acquired. In addition, for example, when the frequency of the current brain wave is within the range of 16 Hz to 17 Hz, the frequency of the current brain wave match with the frequency of any one of the preset brain waves in the brain wave data set unsuccessfully, so that it is impossible to implement acquisition of a control instruction.

It can be contemplated that, the frequencies of the preset brain waves corresponding to the above-described different control instructions are merely illustrative, and are not limitation to the control instruction corresponding to the preset brain wave.

In this way, the brain wave data set pre-stored with the corresponding relationship between the characterized parameter of the preset brain wave and the control instruction, may enable all the brain waves within the range of 12 Hz to 30 Hz to correspond to a plurality of control instructions, without the necessity of eye muscle movement.

On such basis, before the step of acquiring the above-described current brain wave, the method may further comprise:

Firstly, determining the characterized parameter of the preset brain wave, and storing the same.

Secondly, establishing the brain wave data set including the corresponding relationship between the characterized parameter of the preset brain wave and the control instruction, that is, establishing a mapping relationship between the characterized parameter of the preset brain wave and the control instruction. Thus, when the current brain wave matches with the characterized parameter of the preset brain wave successfully, the control instruction having the mapping relationship with the preset brain wave may be invoked by the preset brain wave in an addressing accessing mode.

Figure 3:
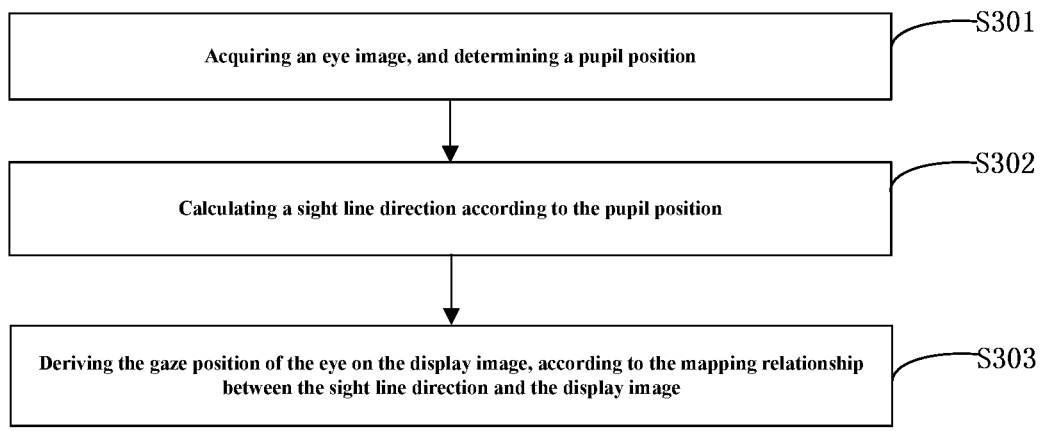
FIG. 3 is a detailed flow chart of a method in which step S103 of FIG. 1*a* is involved.

Further, when the above-described display control method is a display control method executed by the wearable device, the method of acquiring a gaze position on a display image when eyes are gazing at a current display image in the above-described step S101 may, as illustrated in FIG. 3, comprise steps of:

S301: acquiring an eye image, and determining a pupil position.

S302: calculating a sight line direction according to the pupil position.

S303: deriving the gaze position of the eye on the display image 100, according to the mapping relationship between the sight line direction and the display image 100.

In this way, the user can select the operation icon 102 in the display image 100 by the sight line, so that the brain wave can execute the above-described operation icon 102.

Hereinafter, an approach for determining the sight line direction will be illustrated in detail.

For example, the above-described determining the sight line direction may be implemented in a cornea reflex mode.

Figure 4A:
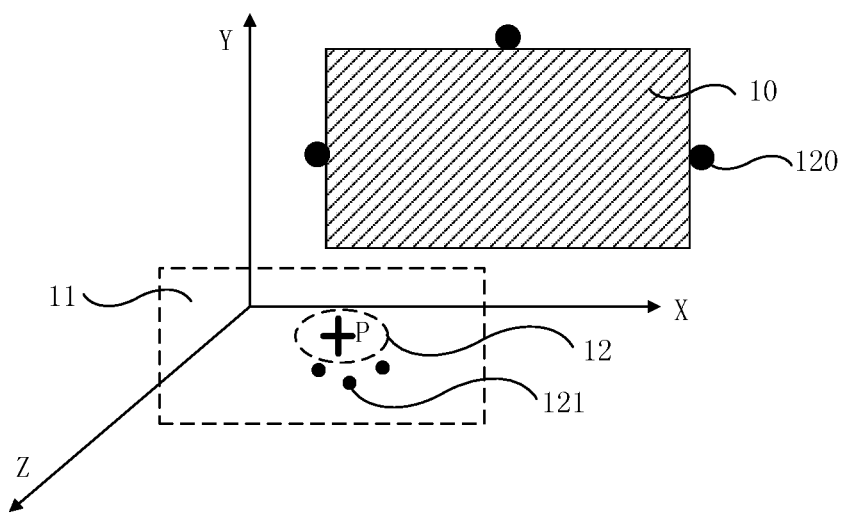
FIG. 4*a* is a schematic diagram of determining a pupil position in step S103 of FIG. 3.

For example, firstly, the above-described step S301 may comprise: providing three infrared light sources 120 at three different positions on the display panel 10 of the wearable device illustrated in FIG. 4a, light sent out from the infrared light source 120 being capable of forming a high brightness reflection point, i.e., a light spot 121, on user's eye cornea. Since an eyeball is an approximate sphere, in a case where a head position is fixed, the light spot 121 is not affected by rotation of the eyeball and will not change. The dashed-line rectangle in FIG. 4a represents imaging 11 of an image on the display panel 10 formed in the human eyes.

Figure 4B:
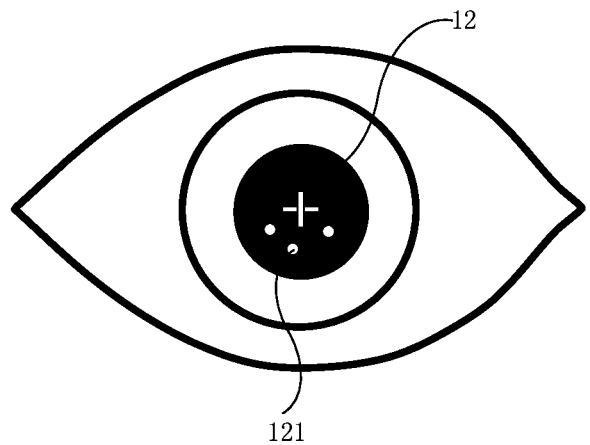
FIG. 4*b* is another schematic diagram of determining the pupil position in step S103 of FIG. 3.
Figure 4C:
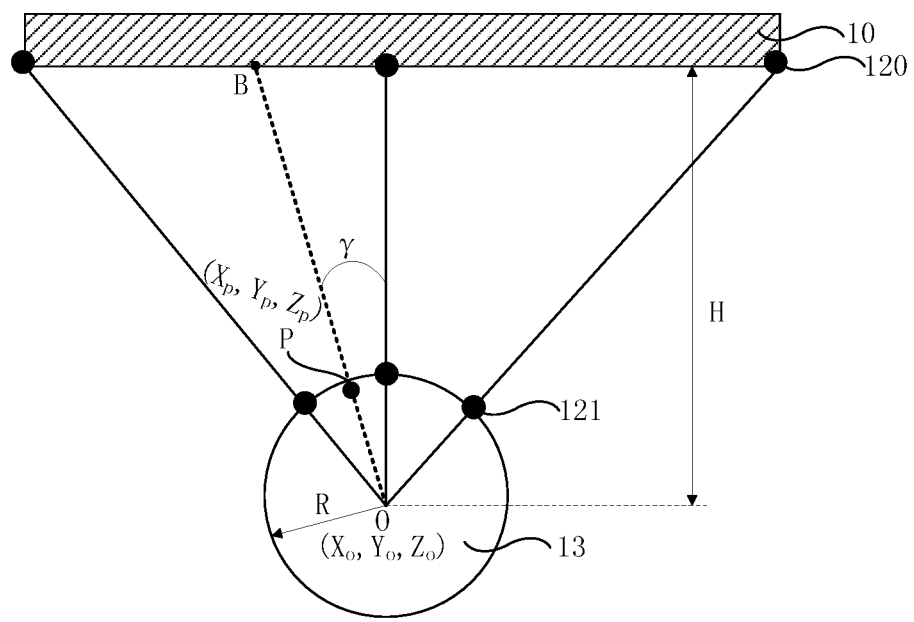
FIG. 4*c* is still another schematic diagram of determining the pupil position in step S103 of FIG. 3.

In this case, an image acquisition device in the wearable device acquires the eye image as illustrated in FIG. 4b, and by processing the eye image, recognizes the three light spots 121 and the pupil 12 in the eye image. As illustrated in FIG. 4a, a center position of the pupil 12 is represented by a point P defined by a cross. In addition, since the above-described three light spots 121 are high brightness reflection points formed by the infrared light sources 120 at three different positions irradiating on the cornea, as illustrated in FIG. 4c, in accordance with the positions of the above-described three light spots 121 and a distance H between the user and the screen, coordinates $(X_O, Y_O, Z_O)$ of a curvature center point O of the user's eyeball 13, and a curvature radius R of the user's eyeball 13 can be derived.

Based on this, boundary sample points of the pupil 12 illustrated in FIG. 4a can be extracted by using an image processing method, and then elliptic fitting may be performed on these sample points by using a least squares elliptic fitting method, so that coordinates $(X_P, Y_P)$ of a center position P of the pupil 12 may be derived. Specifically, the above-described elliptic equation is:

$$x^2+Axy+By^2Cx+Dy+E=0$$

Five parameters A, B, C, D and E in the above-described equation may be derived by using the least squares elliptic fitting method, so that coordinates $(X_P, Y_P)$ of the above-described ellipse center point, i.e., the center position P of the pupil 12 may be derived:

$$X_P = \frac{2BC - AD}{A^2 - 4B}$$

$$Y_P = \frac{2D - AD}{A^2 - 4B}$$

A coordinate $Z_P$ of the center position P of the pupil 12 in a Z-axis is approximately same as difference between a coordinate $Z_O$ of the curvature center point O in the Z-axis and the curvature radius R of the user's eyeball 13. Finally, the coordinates $(X_P, Y_P, Z_P)$ of the center position P of the pupil 12 is derived, so as to complete determination of the position of the pupil 12.

Next, the above-described step S302 comprises determining an comprised angle γ illustrated in FIG. 4c by using the coordinates $(X_P, Y_P, Z_P)$ of the center position P of the pupil 12, such that the coordinates $(X_O, Y_O, Z_O)$ of the curvature center point O of the eyeball 13 is derived, so as to complete determination of the sight line direction.

Finally, the above-described step S303 comprises deriving a position of an eye gazing point B on the display image 100 according to the above-described sight line direction, i.e., the comprised angle γ, in combination with the mapping relationship between the sight line direction and the display image 100, for example, by using the distance H between the user and the screen.

It should be noted that, the above-described sight line tracking mode is to derive the sight line direction by using the position of the pupil 12, with the coordinates of the curvature center point O of the eyeball 13 as a reference. In addition, it is also possible to acquire the position of the pupil 12 of the user while the user gazes at a center position of the display panel 10 before the display image 100 displayed on the display panel 10 is viewed by the user, and use the position of the pupil 12 of the user as a reference point, so as to complete focusing of the pupil 12. Thereafter, when the user is viewing the display image 100, the position of the rotating pupil 12 may be acquired, such that the sight line direction can be obtained by using the reference point obtained in the above-described focusing process. It can be contemplated that, the above is only an illustration of a sight line tracking procedure, and other approaches of determining the sight line direction will no longer be described here one by one.

Figure 5A:
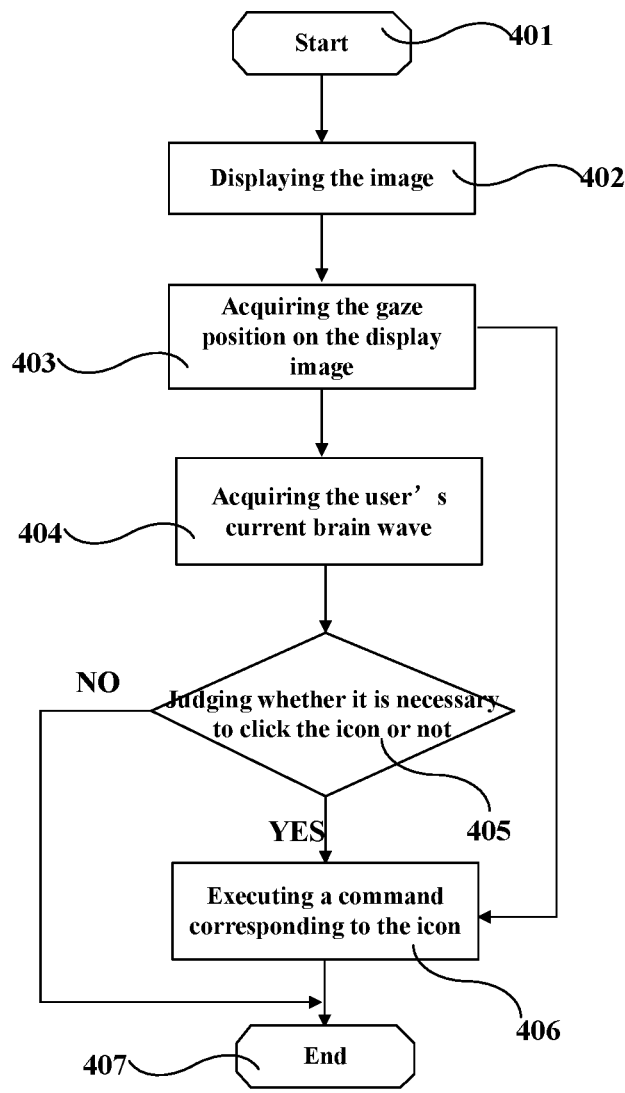
FIG. 5*a* is a flow chart of a display control method provided by an embodiment of the present disclosure.

Hereinafter, the above-described display control method will be described in detail with a case where the user is playing a game as an example, and with the second scenario as an example. The control method illustrated in FIG. 5a comprises:

S401: starting operation.

The user intends to wear the wearable device, the wearable device has a display device integrated thereon. In this step, the user wears the wearable device, and the wearable device is started.

S402: displaying the image 100.

Figure 5B:
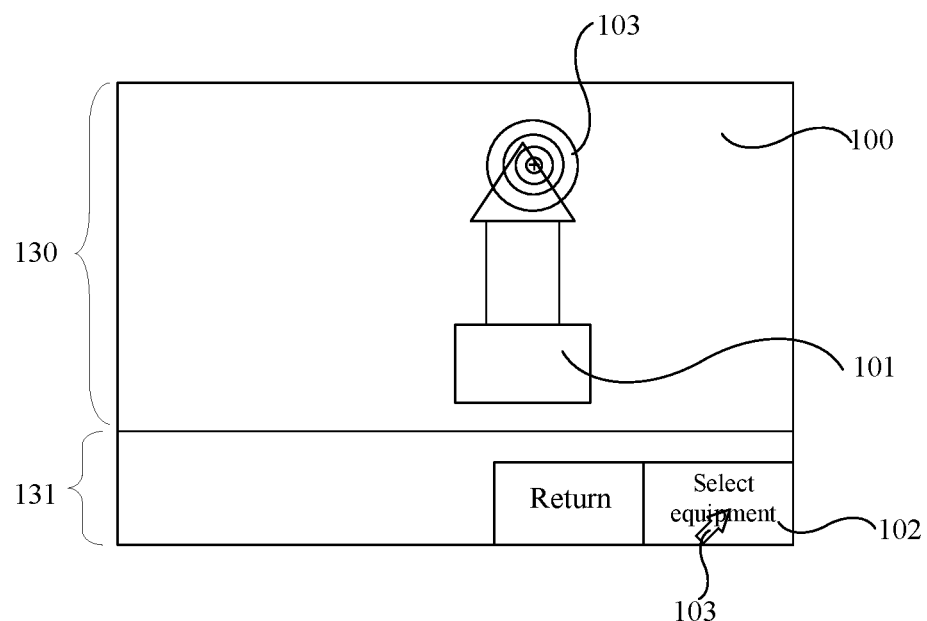
FIG. 5*b* is a schematic diagram of a display image corresponding to FIG. 5*a*.

For example, the display image 100 displayed by the wearable device is illustrated in FIG. 5b. The display image 100 may be divided into a shooting region 130 and a manipulation region 131. The shooting region 130 displays an image main content 101 such as a building, and the manipulation region 131 displays an operation icon 102.

S403: acquiring the gaze position on the display image 100.

For example, when the user selects equipment, the gaze position of the eye on the display image 100 is acquired, wherein, in order that the user understands his/her own gaze position more intuitively, the display image 100 further comprises a virtual gaze point 103 corresponding to the user's gaze position. A target shooting style may be used for the virtual gaze point 103 of the shooting region 130, and an arrow style may be used for the virtual gaze point 103 of the manipulation region 131.

For example, when the user intends to select the equipment, the gaze position of the eye moved to the operation icon 102 of select equipment is acquired, and at this time, the virtual gaze point 103 is located in the operation icon 102 of select equipment.

S404: acquiring the user's current brain wave.

For example, when the virtual gaze point 103 is located in the operation icon 102 of select equipment, the user's current brain wave at this time can be acquired.

S405: judging whether it is necessary to click the operation icon 102 or not.

For example, it is possible to judge whether it is necessary to click the operation icon 102 or not according to the acquired current brain wave. For example, when the frequency of the above-described current brain wave is larger than the frequency threshold, it is possible to determine the operation icon 102 that the user intends to click.

S406: executing a command corresponding to the operation icon 102.

For example, when a judgment result in the above-described step S404 is that the user intends to click the operation icon 102, the operation icon 102 of select equipment where the virtual gaze point 103 is located may be clicked, in combination with the gaze position determined in step S402; and the command corresponding to the operation icon 102 is executed.

Figure 5C:
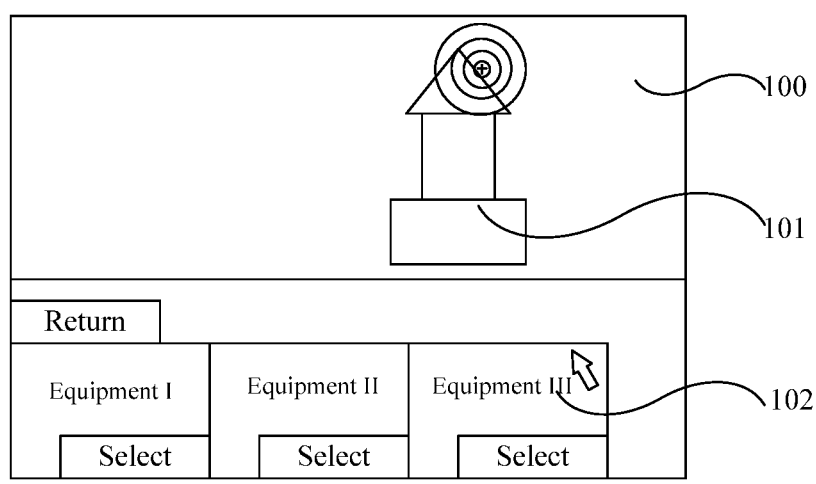
FIG. 5*c* is another schematic diagram of the display image corresponding to FIG. 5*a*.

It should be noted that, when the command of the operation icon 102 of select equipment is executed, a content displayed by the display image 100 is as illustrated in FIG. 5c. In this case, the user can execute the above-described steps S401 to S406 again, to select Equipment I, Equipment II, or Equipment III, or select a return icon. A specific mode is as described above, which will not be repeated here. In addition, when the user has finished selecting the equipment, a position of shooting the building in image main content 101 within the shooting region 130 may also be determined by using the above-described steps, and finally whether it is necessary to execute a shooting operation is controlled by the brain wave.

S407: ending the operation.

In addition, when the judgment result in the above-described step S405 is NO, step S407 may be directly executed.

The above-described step of ending the operation indicates that steps S401 to S406 have been executed, a state of the wearable device is not limited at this time, and the wearable device may be in a shutdown state or a standby state, or a state of executing other operations.

Figure 6:
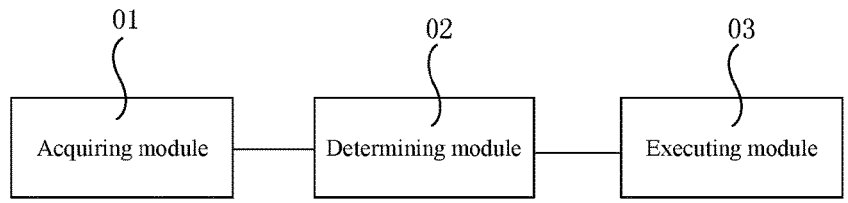
FIG. 6 is a structural schematic diagram of a display control device provided by an embodiment of the present disclosure.

An embodiment of the present disclosure provides a display control device, as illustrated in FIG. 6, comprising: an acquiring module 01, a determining module 02, and an executing module 03. The acquiring module 01 is configured for acquiring a gaze position on a display image 100 when eyes are gazing at a current display image 100 and a current brain wave when the eyes are gazing at the current display image 100. The determining module 02, is configured for determining a control instruction corresponding to the current brain wave according to the current brain wave, when a characterized parameter of the current brain wave acquired by the acquiring module 01 meets a preset condition. The executing module 03 is configured for executing an operation corresponding to the control instruction determined by the determining module 02 on the display image 100 being gazed.

In this way, the user can select an operation position on the display image by the eyes, and send out different brain waves in different thinking states, and therefore, it is possible to judge whether the user intends to execute a corresponding operation at the above-described gaze position through the brain wave or not. Therefore, in the above-described control procedure, it is possible to implement the corresponding operation without manual operation, so that operation convenience of the wearable device can be increased.

However, a frequency of a brain wave when the user is in a focused state, that is, the frequency of brain wave β is in a range of 12 Hz to 30 Hz. Thus, the current brain wave with the frequency of 12 Hz to 30 Hz can only acquire a single control instruction such as a single-click operation. With respect to other instructions, such as a double-click operation or a zoom-in operation, it is necessary to implement in combination with influence of the electromyogram obtained by ocular muscle contraction or expansion on the amplitude of the current brain wave. Complexity of acquiring control instructions is increased.

Figure 7:
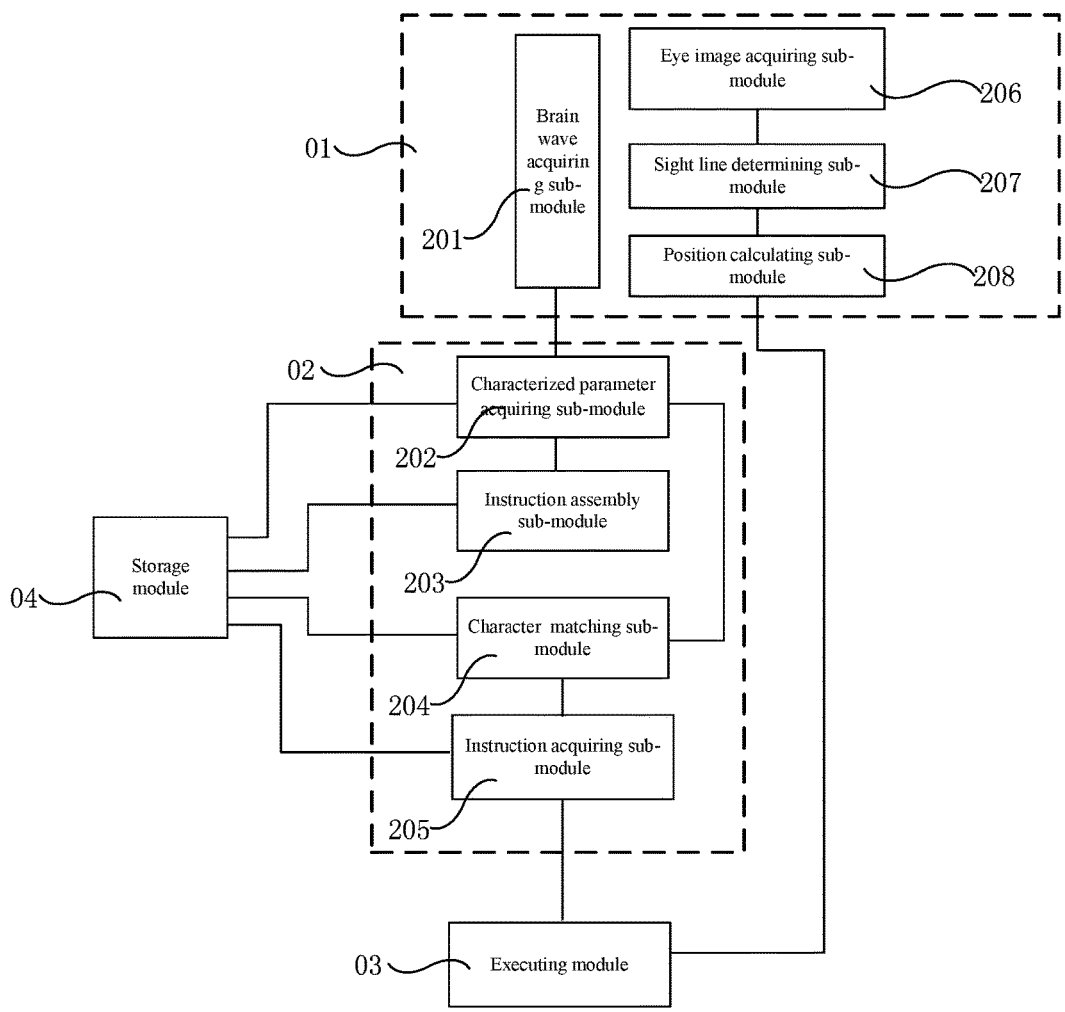
FIG. 7 is a schematic diagram of a connection mode of a specific part of the display control device illustrated in FIG. 6.

In order to solve the above-described problem, the display control device, as illustrated in FIG. 7, further comprises a storage module 04, the acquiring module 01 comprises a brain wave acquiring sub-module 201 for acquiring the current brain wave, and the determining module 02 may comprise a characterized parameter acquiring sub-module 202 and an instruction assembly sub-module 203.

For example, the characterized parameter acquiring sub-module 202 is connected with the brain wave acquiring sub-module 201 and configured for determining the characterized parameters of the current brain wave and the preset brain wave. For example, the characterized parameter may be at least one of the frequency and the amplitude of the brain wave.

For example, the instruction assembly sub-module 203 is connected with the characterized parameter acquiring sub-module 202 and configured for establishing a brain wave data set, the brain wave data set being pre-stored with corresponding relationship between the characterized parameter of the preset brain wave and the control instruction.

For example, the storage module 04 is connected with the characterized parameter acquiring sub-module 202 and the instruction assembly sub-module 203 and configured for storing the control instruction, the characterized parameter, and the brain wave data set.

In this way, it is possible to acquire, by the characterized parameter acquiring sub-module 202, different preset brain waves sent out by the user in a clear and focused state when he/she is in different thinking activity states, in factory settings or initialization of the wearable device. For example, although the frequency of the brain wave β sent out by the user in the clear and focused state may be in a range of 12 Hz to 30 Hz, different thinking activities will make a slight difference between frequencies of brain waves in the range of 12 Hz to 30 Hz. For example, the frequency of the preset brain wave when the user intends to perform the control instruction of a single-click operation is in a range of 12 Hz to 15 Hz, the frequency of the preset brain wave when the user intends to perform the control instruction of a double-click operation is in a range of 18 Hz to 21 Hz, and the frequency of the preset brain wave when the user intends to perform the control instruction of a close operation is in a range of 25 Hz to 30 Hz.

On this basis, the determining module 02 further comprises a character matching sub-module 204. The character matching sub-module 204 is connected with the characterized parameter acquiring sub-module 202 and the storage module 04 and configured for matching the characterized parameter of the current brain wave acquired by the characterized parameter acquiring sub-module 202 with the characterized parameter of the preset brain wave in the brain wave data set stored in the storage module 04.

It should be noted that, the character matching sub-module 204 may be a comparator or a comparison circuit. In addition, the matching the characterized parameter of the current brain wave with the characterized parameter of the preset brain wave refers to that, difference between the characterized parameter of the current brain wave and the characterized parameter of the preset brain wave is within a tolerance deviation range. The deviation may be determined by accuracy of the wearable device. It is not limited in the embodiment of the present disclosure.

In this way, the current brain wave can be acquired by the characterized parameter acquiring sub-module 202, and the frequency of the current brain wave is matched with the frequency of the preset brain wave in the brain wave data set. For example, when the frequency of the current brain wave is within the range of 25 Hz to 30 Hz, the frequency of the current brain wave matches with the frequency of the preset brain wave successfully, so that the control instruction of the close operation corresponding to the matched preset brain wave may be acquired. For example, when the frequency of the current brain waves is within 12 Hz to 15 Hz, the frequency of the current brain wave matches with the frequency of the preset brain wave successfully, so that the control instruction of a single-click corresponding to the preset brain wave may be acquired. In addition, for example, when the frequency of the current brain wave is within 16 Hz to 17 Hz, the frequency of the current brain wave match with the frequency of any one of the preset brain waves in the brain wave data set unsuccessfully, it is impossible to implement acquisition of a control instruction.

It can be contemplated that, the frequencies of the preset brain waves corresponding to the above-described different control instructions are merely illustrative, and are not limitation to the control instruction corresponding to the preset brain wave.

In summary, the brain wave data set pre-stored with the corresponding relationship between the characterized parameter of the preset brain wave and the control instruction, may enable all the brain waves within the range of 12 Hz to 30 Hz to correspond to a plurality of control instructions, without necessity of eye muscle movement.

Further, for example, the determining module 02 further comprises an instruction acquiring sub-module 205, which is connected with each of the character matching sub-module 204 and the storage module 04 and configured for acquiring the control instruction corresponding to the matched preset brain wave from the storage module 04, when the characterized parameter of the current brain wave matches with the characterized parameter of the preset brain wave successfully.

For example, the acquiring module 01, as illustrated in FIG. 7, comprises: an eye image acquiring sub-module 206, a sight line determining sub-module 207 and a position calculating sub-module 208.

For example, the eye image acquiring sub-module 206 is configured for acquiring an eye image, and determining a pupil position. The eye image acquiring sub-module 206 may be a CCD image sensor or a COMS image sensor.

For example, light sent out from the infrared light source 120 is capable of forming a high brightness reflection point, i.e., a light spot 121, on user's eye cornea. In this case, the eye image illustrated in FIG. 4b may be acquired by the CCD image sensor or the COMS image sensor, which, by processing the eye image, can recognize the light spot 121 and the pupil 12 in the eye image, and further determine a position of the pupil 12.

The sight line determining sub-module 207 is connected with the eye image acquiring sub-module 206 and configured for calculating a sight line direction.

The position calculating sub-module 208 is connected with the sight line determining sub-module 207 and configured for deriving a gaze position of the eyes on the display image 100, according to mapping relationship between the sight line direction and the display image 100 as described above.

For example, the above-described approach of determining the gaze position is the same as described above, and will not be repeated here.

Thus, after the gaze position is determined, the above-described executing module 03 can execute the control instruction acquired by the instruction acquiring sub-module 205, according to the gaze position acquired by the acquiring module 01.

Figure 8:
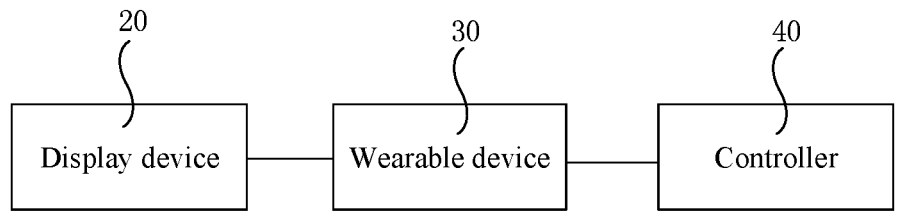
FIG. 8 is a structural schematic diagram of a display control system provided by an embodiment of the present disclosure.

An embodiment of the present disclosure provides a display control system, as illustrated in FIG. 8, comprising: a display device 20, a wearable device 30 and a controller 40.

For example, the display device 20 is configured for displaying an image 100, as a current display image.

For example, the wearable device 30 is configured for acquiring a gaze position on a display image 100 when eyes are gazing at a current display image, and acquiring a current brain wave when the eyes are gazing at the current display image.

For example, the controller 40 is configured for determining a control instruction corresponding to the current brain wave according to the current brain wave, when a characterized parameter of the current brain wave acquired by the acquiring module 01 meets a preset condition; and executing an operation corresponding to the control instruction on the display image 100 being gazed.

In this way, the user can select an operation position on the display image by the eyes, and send out different brain waves in different thinking states, and therefore, it is possible to judge whether the user intends to execute a corresponding operation at the above-described gaze position through the brain wave or not. Therefore, in the above-described control procedure, it is possible to implement the corresponding operation without manual operation, so that operation convenience of the wearable device can be increased.

For example, the display device 20 and the wearable device 30 may be separately provided and connected in a wired or wireless manner for information exchange, and the controller 40 is provided in the display device 20. For example, the above-described display device 20 may be a mobile phone, a computer, a television, or the like. For example, the display device 20 comprises a display panel, which may be a liquid crystal display panel, or an organic light emitting diode (OLED) display panel. For example, the above-described wearable device 30 may be a head-mounted wearable device, in which case the wearable device comprises a head-mounted support for wearing on a head.

For example, the above-described controller 40 is integrated in a mobile phone, a computer, or a television, for receiving, transmitting, and processing data information.

Figure 9:
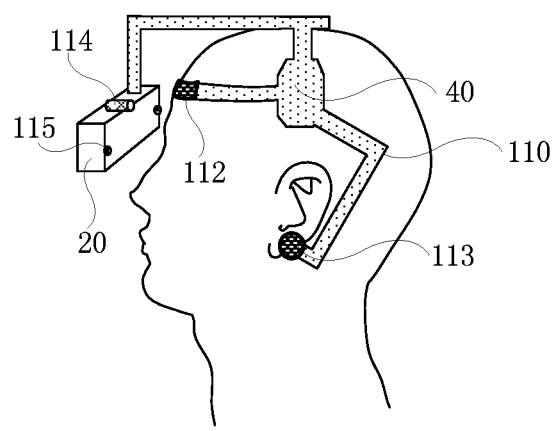
FIG. 9 is a schematic diagram of a specific structure of the display control system illustrated in FIG. 8.

For example, the above-described wearable device 30 may be a head-mounted wearable device, in which case the wearable device, as illustrated in FIG. 9, comprises a head-mounted support 110. The head-mounted support 110 is integrated with the display device 20 and the controller 40.

Figure 10:
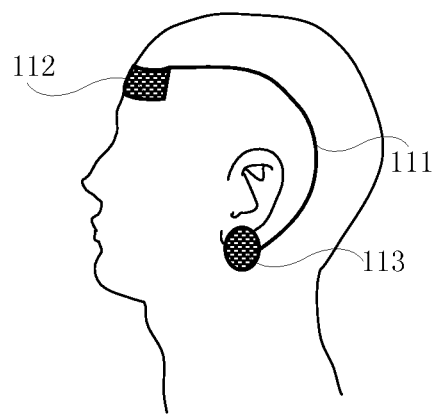
FIG. 10 is a schematic diagram of a brain wave acquisition circuit provided by an embodiment of the present disclosure.

In a case where the above-described wearable device comprises the head-mounted support 110, as an example illustrated in FIG. 9, the above-described head-mounted support 110 is provided with a brain wave acquisition circuit 111 for acquiring the current brain wave as illustrated in FIG. 10, an image acquisition device 114 for acquiring human eye imaging as illustrated in FIG. 9, and a processor (not illustrated) for determining the gaze position of the eyes on the display image according to the image acquired by the image acquisition device 114. The processor is further configured for transmitting the current brain wave and the gaze position to the controller 40.

For example, the above-described brain wave acquisition circuit 111, as illustrated in FIG. 10, comprises a forehead sensor 112 and at least one earlobe sensor 113. For example, the above-described forehead sensor 112 and the at least one earlobe sensor 113 are, as illustrated in FIG. 9, fixed onto the head-mounted support 110; in addition, a circuit for connecting the forehead sensor 112 and the at least one earlobe sensor 113 is provided within the head-mounted support 110. For example, the at least one earlobe sensor 113 comprises an earlobe sensor 113 attached to a left ear lobe and an earlobe sensor 113 attached to a right ear lobe.

For example, the above-described image acquisition device 114 is a CCD image sensor or a CMOS image sensor. In this case, in order to track a sight line in a cornea reflection mode, an infrared light source 115 may be provided on the display device 20, for example, on both sides of the display device 20. An infrared light source may be further provided on the image acquisition device 114 (the infrared light source on the image acquisition device 114 is not illustrated).

Figure 11:
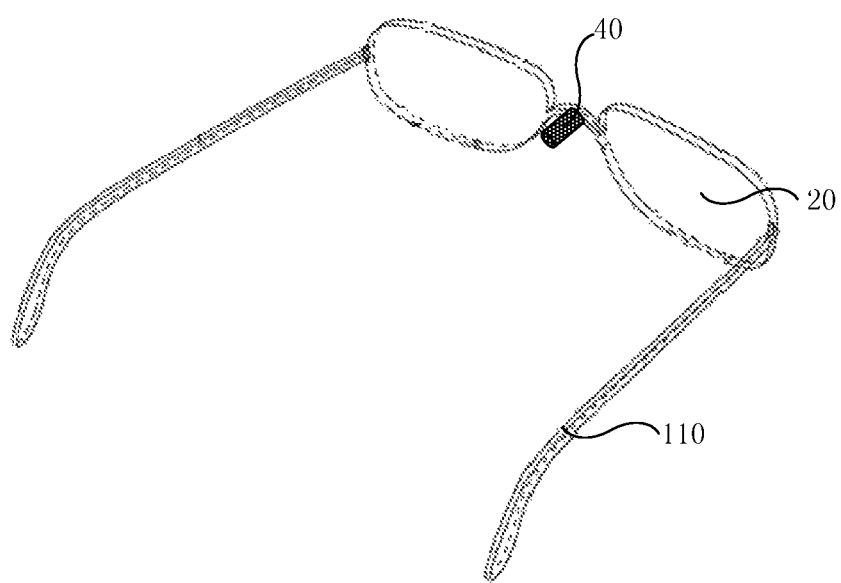
FIG. 11 is another structural schematic diagram of a display control system provided by an embodiment of the present disclosure.

For example, the above-described head-mounted support 110 may be embodied as spectacle frames, as illustrated in FIG. 11, the display device 20 may be mounted at the frame, and the controller 40 may be provided between two adjacent frames.

Those of ordinary skill in the art can understand that all or part of the steps of the method for implementing the above embodiments can be performed by program instruction-related hardware, and the corresponding program can be stored in a computer-readable storage medium, i.e., a medium that can store program codes, such as ROM, RAM, magnetic disk or optical disk. When executed, the program can execute the steps comprised in the embodiments of the above method.

The foregoing embodiments merely are exemplary embodiments of the present disclosure, and not intended to define the scope of the present disclosure, and the scope of the present disclosure is determined by the appended claims.

The present application claims priority of Chinese Patent Application No. 201610041709.5 filed on Jan. 21, 2016, the present disclosure of which is incorporated herein by reference in its entirety as part of the present application.

The invention claimed is:

1. A display control method, comprising:
acquiring a gaze position on a display image while eyes are gazing at a current display image, and acquiring a current brain wave while the eyes are gazing at the current display image;
determining a control instruction corresponding to the current brain wave according to the current brain wave, in condition that a characterized parameter of the current brain wave meets a preset condition; and
executing an operation corresponding to the control instruction on the display image being gazed,
wherein the display control method is a display control method executed by a wearable device, and
wherein the acquiring a gaze position on a display image while eyes are gazing at the display image, comprises:
acquiring an eye image, and determining a pupil position;
calculating a sight line direction according to the pupil position; and
deriving the gaze position of the eyes on the display image, according to a mapping relationship between the sight line direction and the display image,
wherein the acquiring an eye image and determining a pupil position comprises:
providing three infrared light sources at three different positions on a display panel of the wearable device, and light sent out from the three infrared light sources is configured for forming three light spots on a cornea of the eyes; and
recognizing the three light spots and the pupil in the eye image, and deriving coordinates ($X_O$, $Y_O$, $Z_O$) of a curvature center point of an eyeball and coordinates ($X_P$, $Y_P$, $Z_P$) of a center position of the pupil,
wherein the calculating a sight line direction according to the pupil position comprises:
determining a comprised angle by using the coordinates ($X_P$, $Y_P$, $Z_P$) of the center position of the pupil and the coordinates ($X_O$, $Y_O$, $Z_O$) of the curvature center point O of an eyeball is derived,
wherein the deriving coordinates ($X_P$, $Y_P$, $Z_P$) of the center position of the pupil comprises:
extracting boundary sample points of the pupil; and
performing an elliptic fitting on the boundary sample points by using a least squares elliptic fitting method and an elliptic equation:

$$x^2+Axy+By^2+Cx+Dy+E=0,$$

wherein parameters A, B, C, D and E are derived by using the least squares elliptic fitting method, so that coordinates ($X_P$, $Y_P$) of the center position of the pupil is derived by using the following equation:

$$X_P = \frac{2BC - AD}{A^2 - 4B} \quad Y_P = \frac{2D - AD}{A^2 - 4B},$$

and
wherein a coordinate $Z_P$ of the center position of the pupil in a Z-axis is approximately the same as a difference between a coordinate $Z_O$ of the curvature center point O in the Z-axis and a curvature radius of the eyeball, finally, the coordinates ($X_P$, $Y_P$, $Z_P$) of the center position of the pupil is derived.

2. The display control method according to claim 1, wherein before the acquiring the current brain wave, the method further comprises: determining and storing the characterized parameter of the preset brain wave; and establishing the brain wave data set.

3. A display control device, comprising:
an acquiring module, configured for acquiring a gaze position on a display image while eyes are gazing at a current display image, and acquiring a current brain wave while the eyes are gazing at the current display image and comprising:
an eye image acquiring sub-module, configured for acquiring an eye image, and determining a pupil position;
a sight line determining sub-module, connected with the eye image acquiring sub-module and configured for calculating a sight line direction according to the pupil position; and
a position calculating sub-module, connected with the sight line determining sub-module and configured for deriving a gaze position of the eyes on the display image, according to a mapping relationship between the sight line direction and the display image;
a determining module, configured for determining a control instruction corresponding to the current brain wave according to the current brain wave, in condition that a characterized parameter of the current brain wave meets a preset condition;
an executing module, configured for executing an operation corresponding to the control instruction on the display image being gazed; and
a storage module,
wherein the acquiring an eye image and determining a pupil position comprises:
providing three infrared light sources at three different positions on a display panel of the wearable device, and light sent out from the three infrared light sources is configured for forming three light spots on a cornea of the eyes; and
recognizing the three light spots and the pupil in the eye image, and deriving coordinates ($X_O$, $Y_O$, $Z_O$) of a curvature center point of an eyeball and coordinates ($X_P$, $Y_P$, $Z_P$) of a center position of the pupil,
wherein the calculating a sight line direction according to the pupil position comprises:
determining a comprised angle by using the coordinates ($X_P$, $Y_P$, $Z_P$) of the center position of the pupil and the coordinates ($X_O$, $Y_O$, $Z_O$) of the curvature center point O of an eyeball is derived,
wherein the deriving coordinates ($X_P$, $Y_P$, $Z_P$) of the center position of the pupil comprises:
extracting boundary sample points of the pupil; and
performing an elliptic fitting on the boundary sample points by using a least squares elliptic fitting method and an elliptic equation:

$$x^2+Axy+By^2+Cx+Dy+E=0,$$

wherein parameters A, B, C, D and E are derived by using the least squares elliptic fitting method, so that coordinates ($X_P$, $Y_P$) of the center position of the pupil is derived by using the following equation:

$$X_P = \frac{2BC - AD}{A^2 - 4B} \quad Y_P = \frac{2D - AD}{A^2 - 4B},$$

and
wherein a coordinate $Z_P$ of the enter position of the pupil in a Z-axis is approximately the same as a difference between a coordinate $Z_O$ of the curvature center point O in the Z-axis and a curvature radius of the eyeball, finally, the coordinates $(X_P, Y_P, Z_P)$ of the center position of the pupil is derived.

4. The display control device according to claim 3, wherein the determining module further comprises a character matching sub-module;
the character matching sub-module is connected with the characterized parameter acquiring sub-module and the storage module and is configured for matching the characterized parameter of the current brain wave acquired by the characterized parameter acquiring sub-module with the characterized parameter of the preset brain wave in the brain wave data set of the storage module.

5. The display control device according to claim 4, wherein the determining module further comprises an instruction acquiring sub-module, the instruction acquiring sub-module being connected with the character matching sub-module and the storage module respectively and being configured for acquiring the control instruction corresponding to the matched preset brain wave from the storage module, in condition that the characterized parameter of the current brain wave matches with the characterized parameter of the preset brain wave successfully.

6. A display control system, comprising:
a display device configured for displaying an image serving as a current display image;
a wearable device configured for acquiring a gaze position on a display image while eyes are gazing at a current display image, and acquiring a current brain wave while the eyes are gazing at the current display image; and
a controller configured for determining a control instruction corresponding to the current brain wave according to the current brain wave, in condition that a characterized parameter of the current brain wave meets a preset condition; and executing an operation corresponding to the control instruction on the display image being gazed,
wherein the acquiring a gaze position on a display image while eyes are gazing at a current display image display image, comprises:
acquiring an eye image, and determining a pupil position;
calculating a sight line direction according to the pupil position; and
deriving the gaze position of the eyes on the display image, according to a mapping relationship between the sight line direction and the display image,
wherein the acquiring an eye image and determining a pupil position comprises:
providing three infrared light sources at three different positions on a display panel of the wearable device, and light sent out from the three infrared light sources is configured for forming three light spots on a cornea of the eyes; and
recognizing the three light spots and the pupil in the eye image, and deriving coordinates $(X_O, Y_O, Z_O)$ of a curvature center point of an eyeball and coordinates $(X_P, Y_P, Z_P)$ of a center position of the pupil,
wherein the calculating a sight line direction according to the pupil position comprises:
determining a comprised angle by using the coordinates $(X_P, Y_P, Z_P)$ of the center position of the pupil and the coordinates $(X_O, Y_O, Z_O)$ of the curvature center point O of an eyeball is derived,
wherein the deriving coordinates $(X_P, Y_P, Z_P)$ of the center position of the pupil comprises:
extracting boundary sample points of the pupil,
performing an elliptic fitting on the boundary sample points by using a least squares elliptic fitting method and an elliptic equation:

$$x^2 + Axy + By^2 + Cx + Dy + E = 0,$$

wherein parameters A, B, C, D and E are derived by using the least squares elliptic fitting method, so that coordinates $(X_P, Y_P)$ of the center position of the pupil is derived by using the following equation:

$$X_P = \frac{2BC - AD}{A^2 - 4B} \quad Y_P = \frac{2D - AD}{A^2 - 4B},$$

and
wherein a coordinate $Z_P$ of the center position of the pupil in a Z-axis is approximately the same as a difference between a coordinate $Z_O$ of the curvature center point O in the Z-axis and a curvature radius of the eyeball, finally, the coordinates $(X_P, Y_P, Z_P)$ of the center position of the pupil is derived.

7. The display control system according to claim 6, wherein the display device and the wearable device are separately provided and connected with each other in a wired or wireless manner for information exchange, and the controller is provided in the display device.

8. The display control system according to claim 7, wherein the wearable device comprises a head-mounted support, an image acquisition device, and a processor, the head-mounted support being provided with a brain wave acquisition circuit for acquiring the current brain wave, the image acquisition device being configured for acquiring human eye imaging, and the processor being configured for determining the gaze position of the eyes on the display image according to the image acquired by the image acquisition device; and the processor is further configured for transmitting the current brain wave and the gaze position to the display device.

9. The display control system according to claim 6, wherein the wearable device comprises a head-mounted support, and the head-mounted support is integrated with the display device and the controller.

10. The display control system according to claim 9, wherein the head-mounted support is provided with a brain wave acquisition circuit for acquiring the current brain wave, an image acquisition device for acquiring human eye imaging, and a processor for determining the gaze position of the eyes on the display image according to the image acquired by the image acquisition device; and the processor is further configured for transmitting the current brain wave and the gaze position to the display device.

11. The display control system according to claim 8, wherein the brain wave acquisition circuit comprises a forehead sensor and at least one earlobe sensor.

12. The display control system according to claim 8, wherein the image acquisition device is a CCD image sensor or a CMOS image sensor.

13. The display control system according to claim 12, wherein both the image acquisition device and the display device are provided with an infrared light source.

14. The display control system according to claim 10, wherein the brain wave acquisition circuit comprises a forehead sensor and at least one earlobe sensor.

15. The display control system according to claim 10, wherein the image acquisition device is a CCD image sensor or a CMOS image sensor.

16. The display control method according to claim 1, wherein the preset condition comprises a frequency threshold and whether a waveform peak value of the current brain wave is abruptly varied in an acquisition stage.

17. The display control method according to claim 1, wherein the determining a control instruction corresponding to the current brain wave according to the current brain wave, comprises:

determining the characterized parameter of the current brain wave;

matching the characterized parameter of the current brain wave with a characterized parameter of a preset brain wave in a brain wave data set, the brain wave data set being pre-stored with corresponding relationship between the characterized parameter of the preset brain wave and the control instruction; and acquiring a control instruction corresponding to the matched preset brain wave, in condition that the characterized parameter of the current brain wave matches with the characterized parameter of the preset brain wave successfully.

18. The display control method according to claim 1, wherein the characterized parameter is at least one of a frequency and an amplitude of a brain wave.

19. The display control device according to claim 3, wherein the acquiring module comprises a brain wave acquiring sub-module which is configured for acquiring the current brain wave, and the determining module comprises a characterized parameter acquiring sub-module and an instruction assembly sub-module;

the characterized parameter acquiring sub-module is connected with the brain wave acquiring sub-module and is configured for determining the characterized parameters of the current brain wave and the preset brain wave;

the instruction assembly sub-module is connected with the characterized parameter acquiring sub-module and is configured for establishing a brain wave data set, the brain wave data set being pre-stored with corresponding relationship between the characterized parameter of the preset brain wave and the control instruction;

the storage module is connected with the characterized parameter acquiring sub-module and the instruction assembly sub-module and is configured for storing the control instruction, the characterized parameter, and the brain wave data set.

\* \* \* \* \*